United States Patent
Tsuruta

[19]

[11] Patent Number: 6,157,156

[45] Date of Patent: Dec. 5, 2000

[54] MOTOR CONTROLLER

[75] Inventor: Kazuhiro Tsuruta, Fukuoka, Japan

[73] Assignee: Kabushiki Kaisha Yaskawa Denki, Kitakyushu, Japan

[21] Appl. No.: 09/331,319

[22] PCT Filed: Sep. 5, 1997

[86] PCT No.: PCT/JP97/03148

§ 371 Date: Jun. 18, 1999

§ 102(e) Date: Jun. 18, 1999

[87] PCT Pub. No.: WO98/28837

PCT Pub. Date: Feb. 7, 1998

[30] Foreign Application Priority Data

Dec. 20, 1996 [JP] Japan ................................ 8-341387

[51] Int. Cl.[7] .............................. H02P 5/00; G05B 13/16
[52] U.S. Cl. .................... 318/609; 318/568.22; 318/611; 318/610
[58] Field of Search ................................. 318/600–696, 318/701, 138, 254; 364/140–169

[56] References Cited

U.S. PATENT DOCUMENTS

| | | | |
|---|---|---|---|
| 5,159,254 | 10/1992 | Teshima | 318/611 |
| 5,637,974 | 6/1997 | McCann | 318/701 |
| 5,986,424 | 11/1999 | Nakatsuka et al. | 318/568.22 |
| 6,037,736 | 3/2000 | Tsuruta et al. | 318/609 |

FOREIGN PATENT DOCUMENTS

| | | |
|---|---|---|
| 62-126884 | 6/1987 | Japan . |
| 4-325886 | 11/1992 | Japan . |
| 6-78579 | 3/1994 | Japan . |
| 6-217578 | 8/1994 | Japan . |
| 7-93003 | 4/1995 | Japan . |
| 7-131992 | 5/1995 | Japan . |
| 8-205571 | 8/1996 | Japan . |
| 10-75591 | 3/1998 | Japan . |

*Primary Examiner*—Paul Ip
*Attorney, Agent, or Firm*—Morgan, Lewis & Bockius LLP

[57] ABSTRACT

A motor control apparatus for adjusting a gain by identifying an inertia includes a speed control section for determining a torque command and controlling a speed of a motor such that an actual speed of the motor coincides with an inputted speed command; an estimation section for simulating and creating a model of the speed control section so that the motor speed coincides with the speed of the model; and an identifying section for identifying an inertia on a basis of a ratio between a first value which is obtained by time-integrating a first speed deviation of the speed control section during a specified period and a second value which is obtained by time-integrating a second speed deviation of the estimation section during the same period as the specified period, wherein identification of the inertia is performed only in a case where the motor speed within the speed control section and the speed of the model within the estimation section are not zero and coincide to each other, and the inertia is identified on a basis of a ratio between a first value which is obtained by time-integrating an absolute value of the first speed deviation of the speed control section during the specified period and a second value which is obtained by time-integrating an absolute value of the second speed deviation of the estimation section during the same period as the specified period.

5 Claims, 7 Drawing Sheets

MOTOR CONTROLLER

TECHNICAL FIELD

The present invention relates to a control apparatus for a robot, a machine tool or the like, and, in particular, relates to a motor control apparatus having a function of identifying an inertia and adjusting a gain in accordance therewith in a case where the inertia changes during the operation.

BACKGROUND ART

As an apparatus for identifying an inertia in the motor control, there is an apparatus proposed in Japanese Patent Application Hei. 8-230713 by the same applicant as the present invention, for example.

This apparatus includes a speed control section for determining a torque command and controlling a motor speed so that an actual motor speed coincides with an inputted speed command, an estimation section for simulating the speed control section so that a speed of a model coincides with the motor speed, and an identifying section for identifying an inertia on the basis of a ratio between a value which is obtained by time-integrating a speed deviation of the speed control section during a specified period and a value which is obtained by time-integrating a speed deviation of the estimation section during the same period. When the speed deviation of the estimation section is zero and the motor speed is not zero during the specified period, the identifying section performs the calculation for identifying the inertia by using the ratio between the value obtained by time-integrating the speed deviation of the speed control section and the value obtained by time-integrating the speed deviation of the estimation section. In contrast, when the speed command and the motor speed of the speed control section are zero, the time integration within the identifying section is not performed. This apparatus performs the identifying operation on real-time as to an arbitrary speed command, so that the identification of the inertia can be performed even if the inertia changes every moment.

As another method for adjusting an inertia in the motor control, there is a control apparatus for a motor servo system disclosed in Japanese Patent Unexamined Laid-open No. Hei. 4-325886. The publication discloses the control apparatus for a motor servo system which feedback-controls a controllable subject formed by a motor and a mechanical system coupled to the motor. Further, the publication discloses that, since a magnitude of a load inertia is directly reflected on a time-integration value of the current flowing into the motor, time-integration values of the current detection values at an actual servo system and a simulation section thereof in the case of adding the same positional command values are obtained, then a magnitude of the load inertia of the controllable subject is identified while modifying a supposing value of the inertia in accordance with the result of the comparison between the time-integration values, then the control gain within the feedback control loop is adjusted on the basis of the identified value of the load inertia, so that the most suitable operation can be easily realized even if the load inertia changes.

However, in this prior art, the inertia can not be identified in the case where the integration value of the speed deviation within the speed control section or the integration value of the speed deviation within the estimation section becomes zero depending on the integration period for time-integrating the inputted speed command or the speed deviation.

Further, in the case where there are friction and disturbance, since a friction compensation component and a disturbance compensation component are contained in the torque command or the motor current in addition to a command response component, it is required to eliminate the influence due to such compensation components. Further, since it is difficult to coincide the actual speed with the speed of a model depending on the inertia, the trial and the calculation for identifying the inertia is required to be performed several times, so that it takes much time for identifying the inertia. As a result, it has been difficult to perform the tuning on real-time with high accuracy.

DISCLOSURE OF THE INVENTION

An object of the present invention is to provide a motor control apparatus which employs an actual speed as a speed command of a model and has a function capable of identifying an inertia on real-time with only a simple calculation and adjusting a control gain in accordance therewith.

The principle of identifying an inertia according to the present invention will be explained in brief. In the case of accurately obtaining an inertia from a time-integration value of a torque command or a motor current, the inertia can be obtained easily on the basis of a ratio between a speed and the time-integration value of the torque command or the motor current when the transfer function from the torque command or the motor current to the speed is represented only by the inertia and the speed is not zero. By using such a relation, in the case where the same speed command is inputted into an actual speed control section and a model thereof, if an actual speed and a speed of the model are not zero and coincide with each other, the inertia can be obtained from the speeds and the time-integration values of the torque commands or the motor currents in the actual speed control section and the model thereof. However, in fact, since there are friction and disturbance, a friction compensation component and a disturbance compensation component are contained in the torque command or the motor current in addition to a command response component, so that it is required to eliminate the influence due to such compensation components. Further, since it is difficult to coincide the actual speed with the speed of the model depending on the inertia, the trial and the calculation for identifying the inertia is required to be performed several times, so that it takes much time for identifying the inertia. As a result, it has been difficult to perform the tuning on real-time with high accuracy.

In view of the aforesaid fact, according to the present invention, it is supposed that the friction and the disturbance can be compensated to some extent by an integrator within a speed control section, the influence due to friction and disturbance or the like is made as small as possible by time-integrating a speed deviation in place of a torque command or a motor current, and further an actual speed is used as a speed command of a model so as to satisfy a possible condition wherein the actual speed and the speed of a model are not zero and coincide to each other. According to such an arrangement, the present invention can identify an inertia in a short time by performing only a quite simple calculation, so that the tuning operation on real-time can be performed with high accuracy.

In order to solve the aforesaid conventional problem, the present invention is arranged on the basis of this inertia identification principle in a manner that a motor control apparatus comprising:

a speed control section for determining a torque command and controlling a speed of a motor such that an actual speed of the motor coincides with an inputted speed command of a model;

an estimation section for simulating the speed control section so that the motor speed coincides with the speed of the model; and an identifying section for identifying an inertia on a basis of a ratio between a value which is obtained by time-integrating a first speed deviation of the speed control section during a specified period and a value which is obtained by time-integrating a second speed deviation of the estimation section during the same period as the specified period, wherein identification of the inertia is performed only in a case where the motor speed within the speed control section and the speed of the model within the estimation section are not zero and coincide to each other, and the inertia is identified on a basis of a ratio between a first value which is obtained by time-integrating an absolute value of the first speed deviation of the speed control section during the specified period and a second value which is obtained by time-integrating an absolute value of the second speed deviation of the estimation section during the same period as the specified period.

Further, at least two integrators for the speed control section are provided that are each used during a time period for obtaining the time-integration value of the absolute value of the first speed deviation of the speed control section and at least two integrators for the estimation section are provided that are each used during a time of period for obtaining the time-integration value of the absolute value of the second speed deviation of the estimation section, and wherein the at least two integrators for the speed control section are alternately changed over and the at least two integrators for the estimation section are alternately changed over so that alternate ones of the at least two integrators having completed the integration are cleared to zero and start the time-integration of the absolute values of the speed deviations.

A motor control apparatus according to the present invention is arranged to comprise:

a speed control section for determining a torque command and controlling a speed of a motor such that an actual speed of the motor coincides with an inputted speed command;

an estimation section for simulating the speed control section so that the motor speed coincides with the speed of the model;

an identifying section for identifying an inertia, only in a case where the motor speed within the speed control section and the speed of the model within the estimation section are not zero and coincide to each other, on a basis of a ratio between a first value which is obtained by time-integrating during a specified period an absolute value of a value obtained by passing a first speed deviation of the speed control section through a predetermined filter and a second value which is obtained by time-integrating an absolute value of a second speed deviation of the estimation section during the same period as the specified period; and an adjusting section for adjusting a control gain on a basis of a value obtained by passing a ratio between the inertia identified within the identification section and an inertia within the estimation section through a predetermined filter.

Further, the filter for passing the first speed deviation of the speed control section is a transfer function from the speed command to the motor speed of the speed control section.

Further, values of the integrators in a case of employing a proportional integral (PI) control method, an integral proportion (IP) control method, or a proportional integral and differential (PID) control method as a control method within the speed control section are adjusted by the control gain of the adjusting section.

BEST MODE FOR CARRYING OUT THE INVENTION

Figure 1:
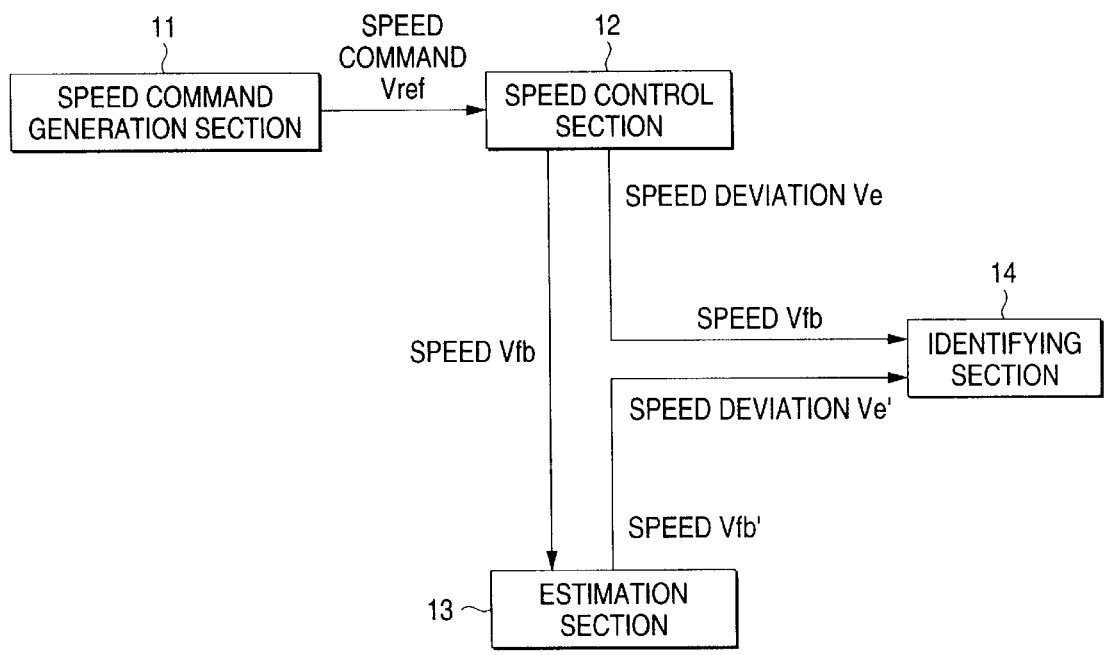
FIG. 1 is a block diagram showing a motor control system according to the first embodiment of the present invention.

FIG. 1 is a block diagram showing a motor control system according to the first embodiment of the present invention. A speed command generation section 11 outputs a speed command Vref to a speed control section 12. The speed control section 12 outputs a motor speed Vfb within the speed control section to an estimation section 13 and further outputs a speed deviation Ve and a motor speed Vfb to an identifying section 14. The estimation section 13 simulates the speed control section 12 so that the motor speed Vfb coincides with a speed Vfb' of a model, and outputs a speed deviation Ve' and a speed Vfb' to the identifying section 14. The identifying section 14 receives the speed deviation Ve and the motor speed Vfb from the speed control section 12 and also receives the speed deviation Ve' and the speed Vfb' from the estimation section 13 thereby to obtain an inertia J.

Figure 2:
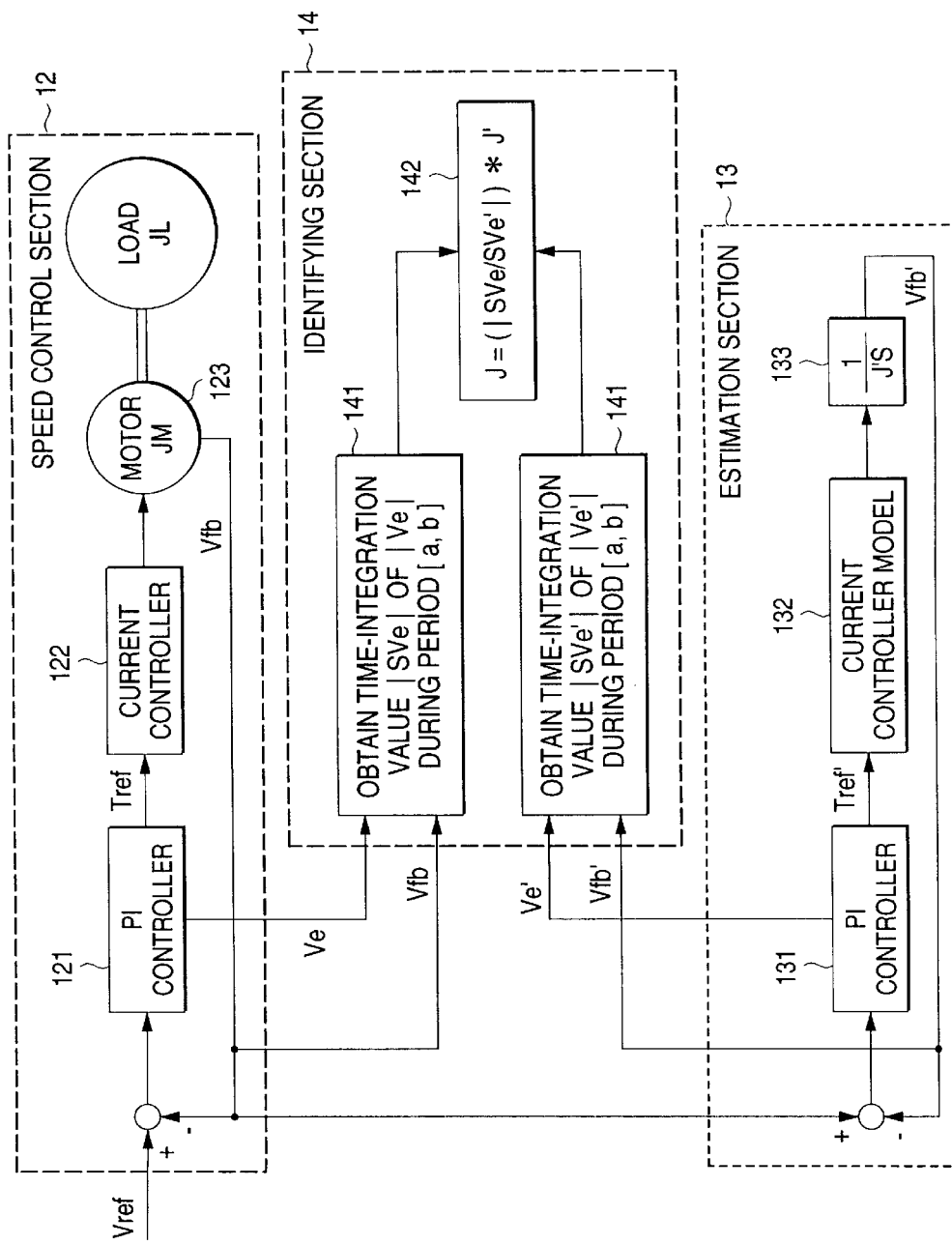
FIG. 2 is a block diagram showing the arrangement of a speed control section, an estimation section and an identifying section in FIG. 1.

FIG. 2 is diagram showing the arrangement of the speed control section 12, the estimation section 13 and the identifying section 14. The speed control section 12 receives the speed command Vref from the speed command generation section 11, and is arranged to form a speed loop such that the speed Vfb of the motor coincides with the speed command Vref. In the speed controller, a PI controller 121 arranged to form a PI (proportional integral) controller outputs a torque command Tref to a current controller 122 for driving a motor 123. The speed controller also outputs the motor speed Vfb to the estimation section 13, and outputs the speed command, the speed deviation Ve of the motor speed and the motor speed Vfb to the identifying section 14. The motor 123 is coupled with a load JL and the motor 123 outputs the motor speed Vfb.

The estimation section 13 receives the motor speed Vfb from the speed control section 12 as a speed command. The estimation section is arranged like the speed control section 12 by a PI controller 131, a current controller model 132 and a controllable subject model 133 which is formed by modeling the controllable subject on 1/J'S, and outputs the speed deviation Ve' and the speed Vfb' to the identifying section 14.

The identifying section 14 receives the speed deviation Ve and the motor speed Vfb outputted from the speed control section 12 and also receives the speed deviation Ve' and the speed Vfb' outputted from the estimation section 13, then obtains absolute values of the respective speed deviations. Thereafter, an integrator 141 effects the time integration as to the absolute values during a specified period [a, b], then a calculation section 142 obtains the inertia J of the speed control section on the basis of the thus obtained time integration values |SVe| and |SVe'| and an inertia J' (known constant value) of the estimation section as represented by the following expression.

$$J=(|SVe|/SVe'|)*J' \quad (1)$$

In this respect, the calculation of the expression (1) is performed only in the case where the motor speed Vfb within the speed control section and the speed Vfb' within the estimation section are not zero and coincide to each other.

Then, the method of setting the integration period [a, b] and the reading period of the integration values will be explained with reference to FIG. 3. In this embodiment, the two integrators each for integrating the absolute value of the speed deviation Ve within the speed control section are provided and also the two integrators each for integrating the absolute value of the speed deviation Ve' within the estimation section are provided.

The two integrators for the speed deviation within the speed control section and the two integrators for the speed deviation within the estimation section are alternately changed over in a manner that the integration periods thereof are shifted by a half period therebetween as shown in MODE0 and MODE1. The reading periods of the integration values from the integrators are the latter half periods 1, 2, 3, - - - of the respective integration periods which are less influenced by the error as compared with the former half periods. The integration values are read at some timings of these reading periods.

Figure 3:
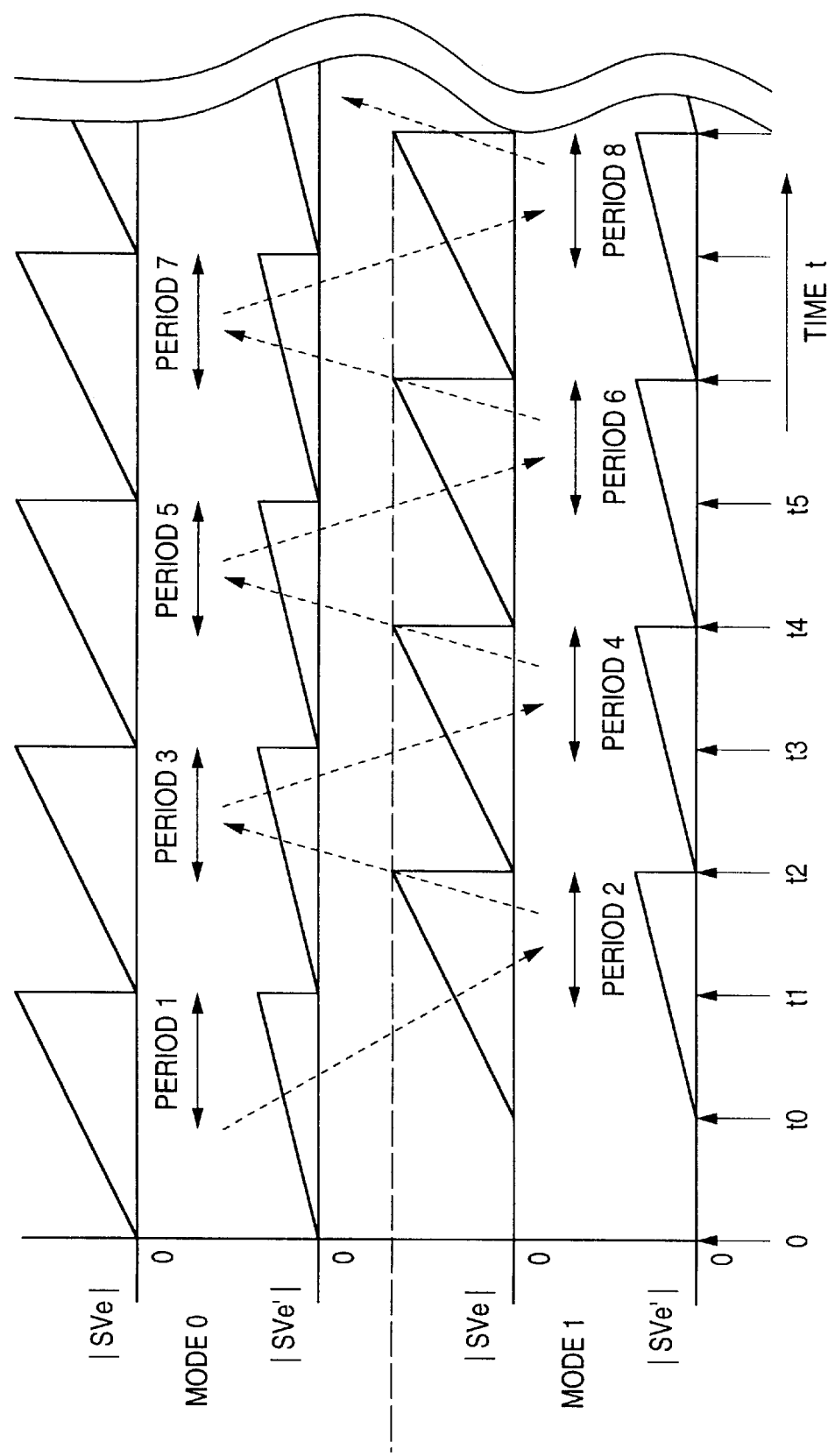
FIG. 3 is a diagram used for explaining in detail the identifying section in FIG. 2.

During a time point t0 to a time point t1 (period 1), the calculation of the expression (1) is performed in parallel with the integration by using the processing MODE0 shown in the upper portion in FIG. 3. At the time point t1, the processing shifts to the MODE1 shown in the lower portion in FIG. 3. Simultaneously, in the processing MODE0, the output values |SVe51 and |SVe'| of the integrators are cleared to zero and then the integration operations are started again. During the time point t1 to a time point t2 (period 2), the calculation of the expression (1) is performed in parallel with the integration by using the processing MODE2. At the time point t2, the processing shifts to the MODE0 again, and, simultaneously, in the processing MODE1, the output values |SVe| and |SVe| of the integrators are cleared to zero and then the integration operations are started again.

In this manner, such periods are shifted sequentially (period 1→period 2→period 3→period 4→period 5→ - - -) while repeating such a series of processings, whereby an inertia can be identified in good response to the speed deviation influenced by the load change without overflowing the time integration values of the absolute values of the speed deviations. When explained the period [a, b] for performing the time integration of the speed deviation as an example of the period 3, the time point a corresponds to the time point 1 and the time point b corresponds to some time point for reading during the time point 2 to a time point 3.

Figure 4:
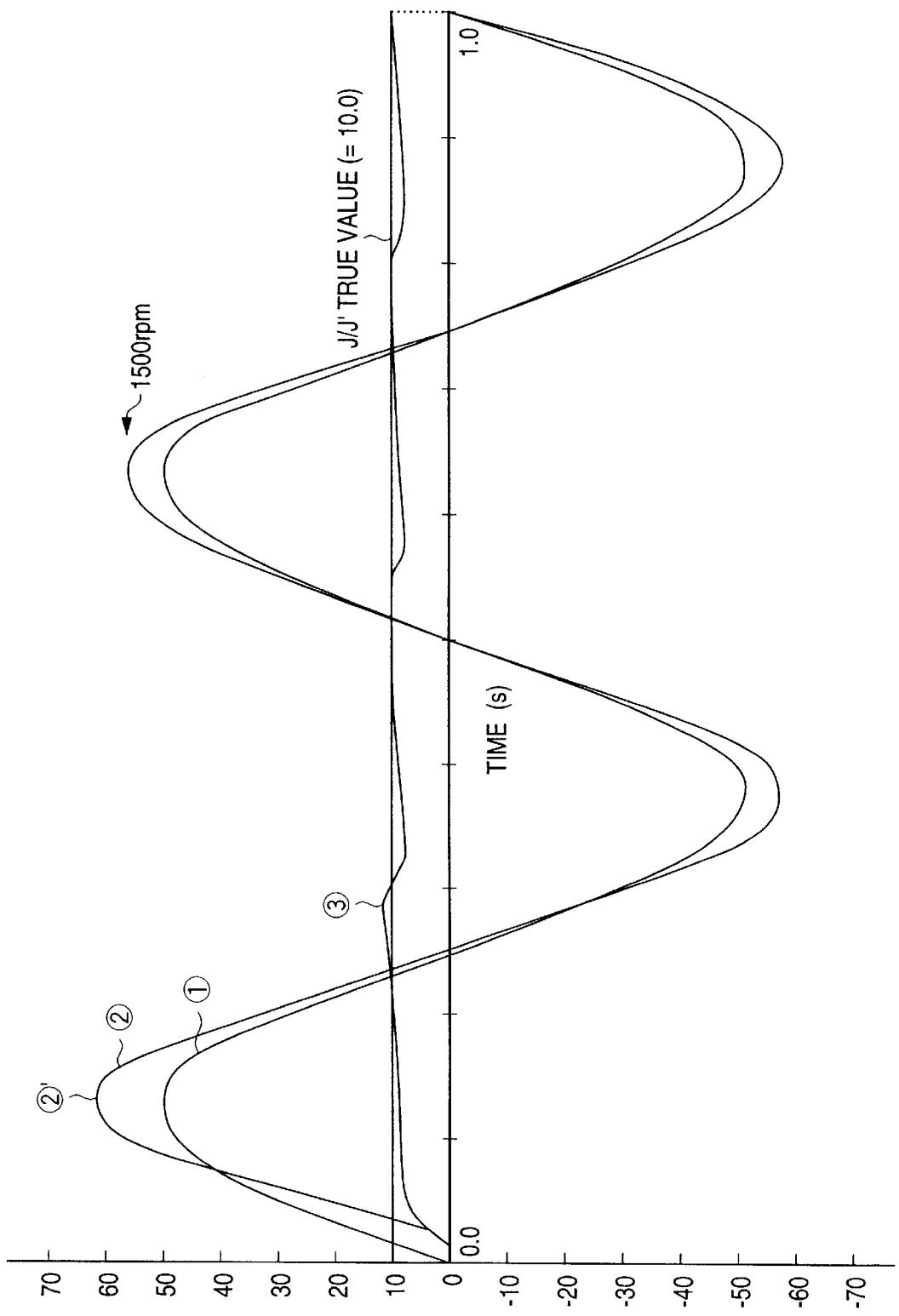
FIG. 4 is a diagram showing an example of the operation of the motor control system using an AC servo motor.

FIG. 4 is a diagram showing an example of the operation of the motor control system using an AC servo motor. In the figure, a symbol ① represents the speed command Vref instructing the maximum speed of 1,500 rpm with 2.0 Hz. A symbol ② represents the motor speed Vfb within the speed control section 12, a symbol ②' represents the speed Vfb' within the estimation section 13, and a symbol ③ represents a ratio (③=J/J') between the inertia J identified within the identifying section 14 and the inertia J' within the estimation section 13 which is represented at every control period. The value of the ratio almost coincides with {(motor inertia JM)+(load inertia JL=9.0 * JM)}/(motor inertia JM)=10.0. In this respect, the inertia J' within the estimation section is simulated as J'=JM. Further, in the case where the expression Vfb=Vfb' 0 is not satisfied, the calculation of the aforesaid expression (1) is not performed and the inertia J' is determined as the identification value at the previous control time.

Although the explanation has been made as to the identification of the inertia in the first embodiment, when an adjusting section is provided like the following second embodiment, the control gain can be adjusted by identifying the inertia.

Figure 5:
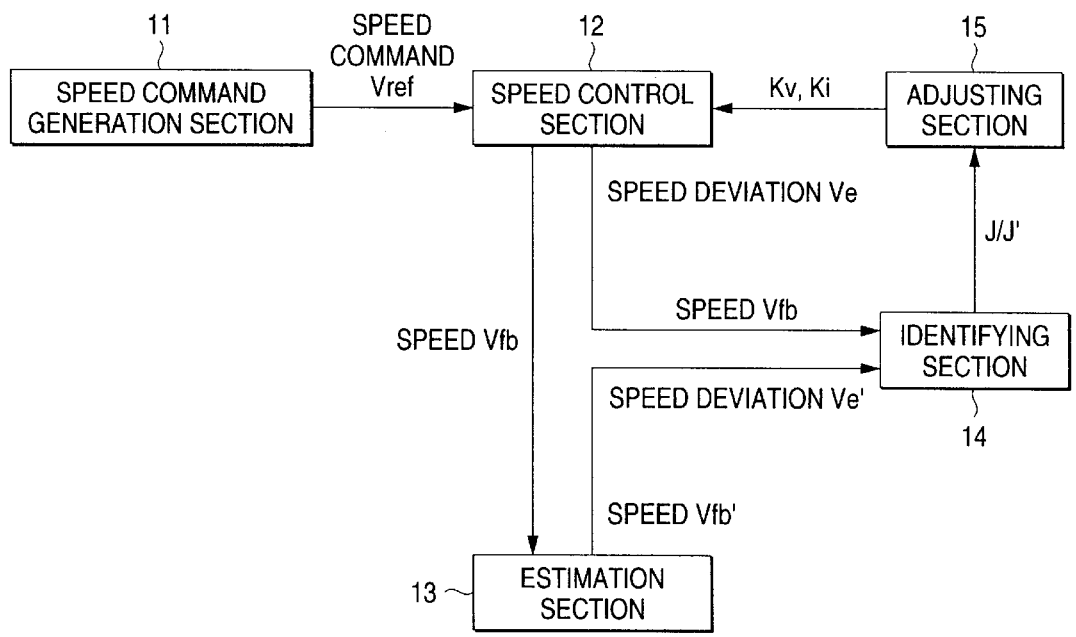
FIG. 5 is a block diagram showing a motor control system according to the second embodiment of the present invention.

FIG. 5 is a block diagram showing a motor control system according to the second embodiment of the present invention. A speed command generation section 11 outputs a speed command Vref to a speed control section 12. The speed control section 12 outputs a motor speed Vfb within the speed control section to an estimation section 13 and further outputs a speed deviation Ve and a motor speed Vfb to an identifying section 14. The estimation section 13 simulates the speed control section 12 so that the motor speed Vfb coincides with a speed Vfb' of a model. The identifying section 14 receives the speed deviation Ve and the motor speed Vfb from the speed control section 12 and also receives a speed deviation Ve' and a speed Vfb' from the estimation section 13 thereby to obtain an inertia J, and outputs an inertia ratio J/J' to an adjusting section 15. The adjusting section 15 receives the inertia ratio J/J', then determines a proportional gain Kv and an integration gain Ki within the speed control section 12 on the basis of a value obtained through a predetermined filter, and adjusts the values of integrators within the speed control section.

Figure 6:
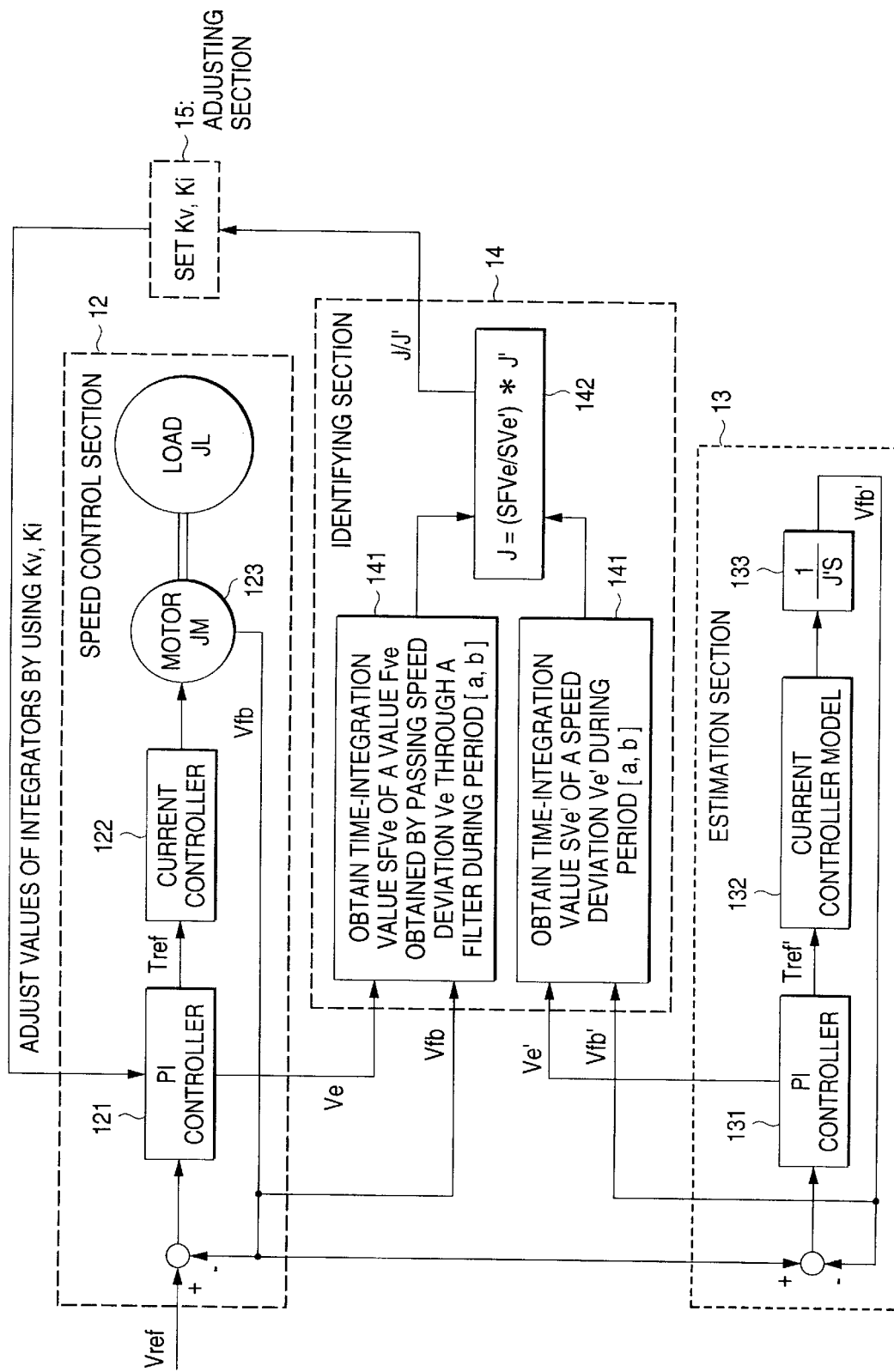
FIG. 6 is a block diagram showing the arrangement of a speed control section, an estimation section, an identifying section and an adjusting section of the second embodiment.

FIG. 6 is a diagram showing the arrangement of the speed control section 12, the estimation section 13, the identifying section 14 and the adjusting section 15. The speed control section 12 receives the speed command Vref from the speed command generation section 11, and is arranged to form a speed loop such that the speed Vfb of the motor coincides with the speed command Vref. In the speed controller, a PI controller 121 arranged to form a PI (proportional integral) controller outputs a torque command Tref to a current controller 122 for driving a motor 123. The speed controller also outputs the motor speed Vfb to the estimation section 13, and outputs the speed deviation Ve and the motor speed Vfb to the identifying section 14. The motor is coupled with a load JL and the motor outputs the motor speed Vfb.

The estimation section 13 receives the motor speed Vfb from the speed control section 12 as a speed command. The estimation section is arranged like the speed control section 12 by a PI controller 131, a current controller model 132 and a controllable subject model 133 which is formed by modeling the controllable subject on 1/J'S, and outputs the speed deviation Ve' and the speed Vfb' to the identifying section 14.

The identifying section 14 receives the speed deviation Ve and the motor speed Vfb outputted from the speed control section 12 and also receives the speed deviation Ve' and the speed Vfb' outputted from the estimation section 13, then obtains an absolute value of the speed deviation Ve' and an absolute value of a value FVe which is obtained by passing the speed deviation Ve through a filter formed by a model of a transfer function from the speed command Vref to the motor speed Vfb. Thereafter, an integrator 141 effects the time integration as to the absolute values during a specified period [a, b], then a calculation section 142 obtains the inertia J of the speed control section on the basis of the thus obtained time integration values |SFVe| and |SVe'| and an inertia J' (known constant value) of the estimation section as represented by the following expression.

$$J=(|SFVe|/|SVe'|)*J' \qquad (2)$$

In this respect, the calculation of the expression (2) is performed only in the case where the motor speed Vfb within the speed control section and the speed Vfb' within the estimation section are not zero and coincide to each other.

Then, the method of setting the integration period [a, b] and the reading period of the integration values will be explained with reference to FIG. 3. In this embodiment, like the first embodiment, the two integrators each for integrating the absolute value of the FVe obtained by filtering the speed deviation Ve within the speed control section are provided and also the two integrators each for integrating the absolute value of the speed deviation Ve' within the estimation section are provided.

The two integrators for the speed deviation within the speed control section and the two integrators for the speed deviation within the estimation section are alternately changed over in a manner that the integration periods thereof are shifted by a half period therebetween as shown in MODE0 and MODE1. The reading periods of the integration values from the integrators are the latter half periods 1, 2, 3, - - - of the respective integration periods which are less influenced by the error as compared with the former half periods. The integration values are read at some timings of these reading periods.

During a time point t0 to a time point t1 (period 1), the calculation of the expression (2) is performed in parallel with the integration by using the processing MODE0 shown in the upper portion in FIG. 3. At the time point t1, the processing shifts to the MODE1 shown in the lower portion in FIG. 3. Simultaneously, in the processing MODE0, the output values |SFVe| and |SVe'| of the integrators are cleared to zero and then the integration operations are started again. During the time point t1 to a time point t2 (period 2), the calculation of the expression (2) is performed in parallel with the integration by using the processing MODE1. At the time point t2, the processing shifts to the MODE0 again, and, simultaneously, in the processing MODE1, the output values |SFVe| and |SVe'| of the integrators are cleared to zero and then the integration operations are started again.

In this manner, such periods are shifted sequentially (period 1→period 2→period 3→period 4→period 5→ - - -) while repeating such a series of processings, whereby an inertia can be identified in good response to the speed deviation influenced by the load change without overflowing the time integration values of the absolute values of the speed deviations. When explained the period [a, b] for performing the time integration of the speed deviation as an example of the period 3, the time point a corresponds to the time point 1 and the time point b corresponds to some time point for reading during the time point 2 to a time point 3.

The adjusting section 15 updates the proportional gain Kv and the integration gain Ki within the speed control section 12 on the basis of the value which is obtained by passing the ratio (=J/J') between the inertias obtained within the identifying section 14 through the predetermined filter, and further adjusts the values of the integrators within the speed control section.

Figure 7:
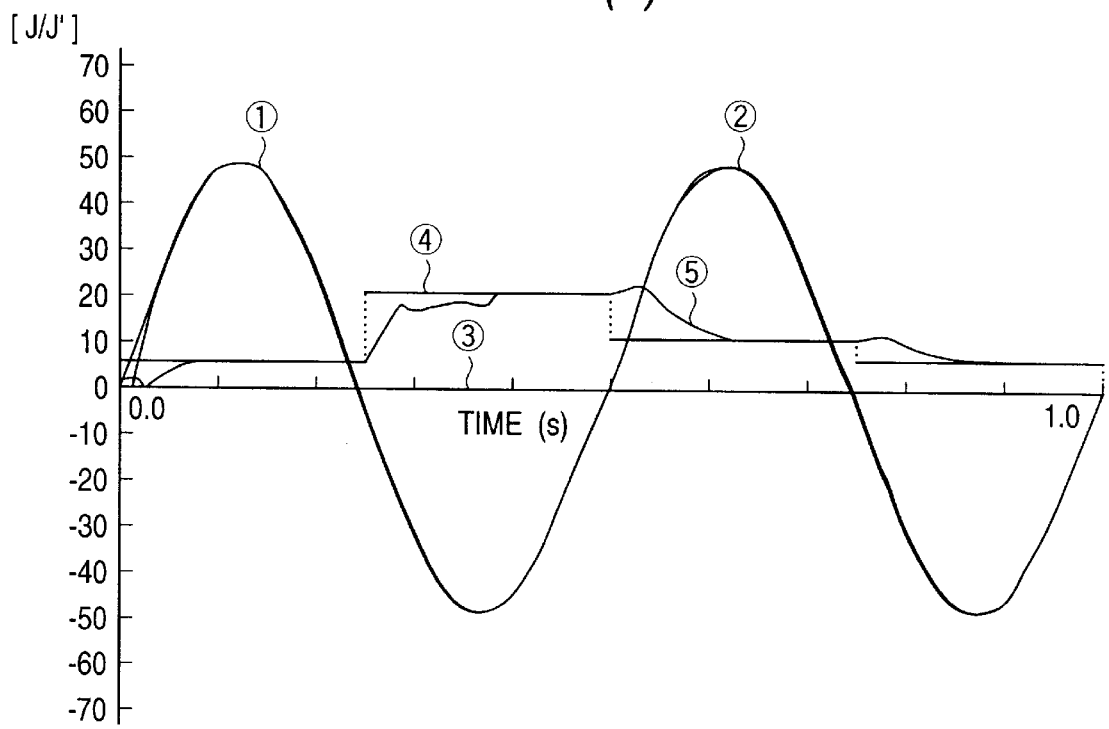
FIG. 7 is diagram showing examples of response using the simulation, wherein (A) is a diagram according to the second embodiment and (B) is a diagram not according to the second embodiment.
Figure 7:
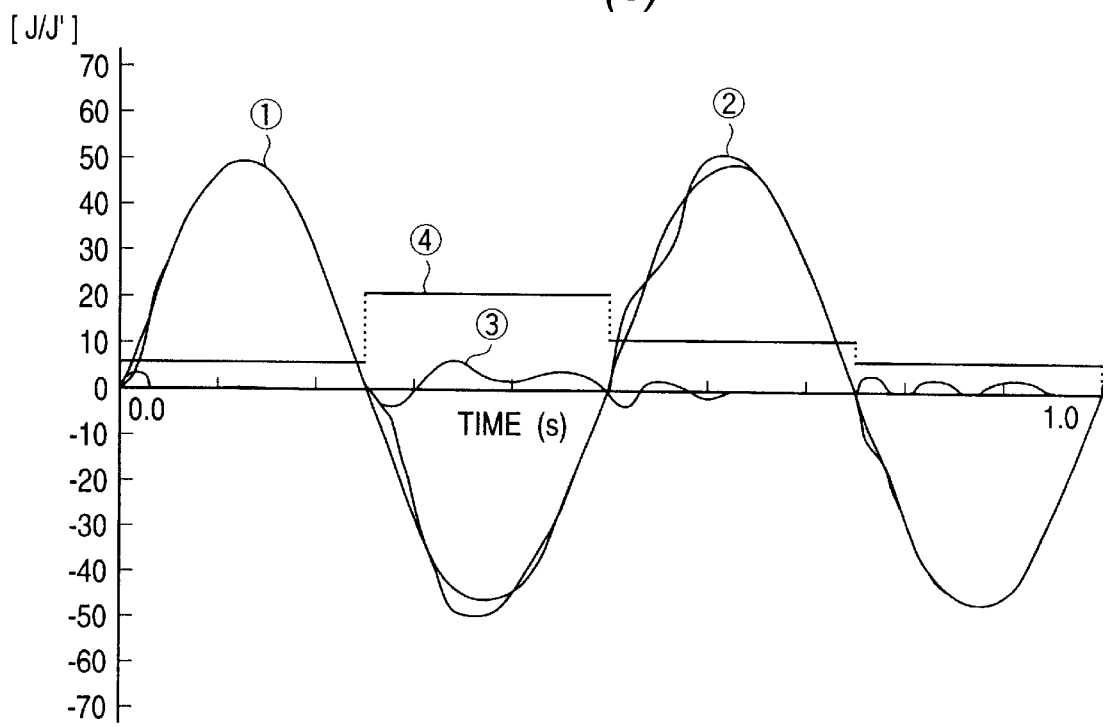

Then, examples of the response using the simulation will be shown in FIG. 7. In the figure, (A) shows the example of the response using the present invention, while (B) shows the example of the response not using the present invention. In this figure, a symbol ① represents the speed command Vref instructing the maximum speed of 1,500 rpm with 2.0 Hz. A symbol ② represents the speed Vfb obtained by simulating the motor speed, a symbol ③ represents the speed deviation Ve, a symbol ④ represents a ratio (④=JN/J') between an inertia JN of the total load JN (JN=JM+JL) set by the simulation and the inertia J' within the estimation section 13, and a symbol ⑤ represents a value which is obtained by passing the ratio (=J/J') between the inertia J identified within the identifying section 14 and the inertia J' within the estimation section 13 through a primary filter with a time constant of 50 ms within the adjusting section 15, which is represented at every control period. In this respect, the inertia J' within the estimation section is simulated as J'=JM. Further, in the case where the expression Vfb=Vfb' 0 is not satisfied, the calculation of the aforesaid expression (2) is not performed and the inertia J' is determined as the identification value at the previous control time. In the adjusting section15, the proportional gain Kv within the speed control section is calculated on the basis of the calculation expression of Kv=Kv*⑤ in accordance with the inertia ratio ⑤ so that the proportional gain is updated at every control period. The integration gain Ki is set to be a value suitable for the proportional gain Kv. As clear from the figure, even when the inertia changes in a manner that 5 times→20 times→10 times→5 times, the inertia can be identified quickly with a high accuracy by using the present invention, so that the present invention can obtain stable response without being influenced by the changes of the inertia.

As clear from the aforesaid explanation of the second embodiment, it will be easy for those skilled in the art to adjust the control gain by providing the adjusting section in the first embodiment and further by identifying the inertia.

INDUSTRIAL APPLICABILITY

As explained above, the present invention can provide a motor control apparatus which can identify on real-time an inertia which changes every moment without being limited by the integration periods for effecting the time integration as to the inputted speed command and the speed deviation.

Further, according to the present invention, the influence due to the friction, the disturbance or the like can be made as little as possible. Furthermore, since the real speed is set as the speed command of a model so as to satisfy a condition that the real speed and the model speed are not zero and coincide to each other, the inertia can be identified in a very short time through only a very simple calculation. Accordingly, a motor control apparatus which has a control gain adjusting function and can perform the tuning on real time with a high accuracy can be provided.

I claim:

1. A motor control apparatus comprising:
    a speed control section for determining a torque command and controlling a speed of a motor such that an actual speed of said motor coincides with an inputted speed command;
    an estimation section for simulating and creating a model of said speed control section so that the motor speed coincides with the speed of said model; and an identifying section for identifying an inertia on a basis of a ratio between a first value which is obtained by time-integrating a first speed deviation of said speed control section during a specified period and a second value which is obtained by time-integrating a second speed deviation of said estimation section during the same period as said specified period, wherein identification of the inertia is performed only in a case where the motor speed within said speed control section and the speed of said model within said estimation section are not zero and coincide to each other, and the inertia is identified on a basis of a ratio between the first value which is obtained by time-integrating an absolute value of the first speed deviation of said speed control section during said specified period and the second value which is obtained by time-integrating an absolute value of the second speed deviation of said estimation section during the same period as said specified period.

2. The motor control apparatus according to claim 1, wherein at least two integrators for said speed control section are provided and are each used during a time period for obtaining the first value and at least two integrators for said estimation section are provided and are each used during a time period for obtaining the second value and wherein said at least two integrators for said speed control section are alternately changed over and said at least two integrators for said estimation section are alternately changed over so that alternate ones of said at least two integrators having completed the integration are cleared to zero before starting the time-integration of the absolute value of the speed deviations.

3. A motor control apparatus comprising:

a speed control section for determining a torque command and controlling a speed of a motor such that an actual speed of said motor coincides with an inputted speed command;

an estimation section for simulating and creating a model of said speed control section so that the motor speed coincides with the speed of said model;

an identifying section for identifying an inertia, only in a case where the motor speed within said speed control section and the speed of said model within said estimation section are not zero and coincide to each other, said inertia being identified on a basis of a ratio between a first value which is obtained by time-integrating during a specified period an absolute value of a value obtained by passing a first speed deviation of said speed control section through a predetermined filter and a second value which is obtained by time-integrating an absolute value of a second speed deviation of said estimation section during the same period as said specified period; and an adjusting section for adjusting a control gain on a basis of a third value obtained by passing a ratio between the inertia identified within said identification section and an inertia within said estimation section through a predetermined filter.

4. The motor control apparatus according to claim 3, wherein said filter for passing the first speed deviation of said speed control section is a transfer function from the speed command to the motor speed of said speed control section.

5. The motor control apparatus according to claim 1, wherein a proportional integral (PI) control method, an integral proportion (IP) control method, or a proportional integral and differential (PID) control method is used as a control method within said speed control section, and said first and second values are adjusted by the control gain of said adjusting section.

* * * * *